(12) United States Patent
Graham et al.

(10) Patent No.: US 6,469,280 B2
(45) Date of Patent: Oct. 22, 2002

(54) ELECTRIC HEATER HANGING ASSEMBLY FOR CHAFING DISHES

(75) Inventors: Everett F. Graham, Villa Ridge; Samuel S. Dew, Labadie, both of MO (US)

(73) Assignee: BBC Industries, Inc., Fenton, MO (US)

(*) Notice: Subject to any disclaimer, the term of this patent is extended or adjusted under 35 U.S.C. 154(b) by 0 days.

(21) Appl. No.: 09/865,278

(22) Filed: May 24, 2001

(65) Prior Publication Data

US 2002/0014481 A1 Feb. 7, 2002

Related U.S. Application Data

(60) Provisional application No. 60/207,262, filed on May 26, 2000.

(51) Int. Cl.[7] .............................. A47J 36/24; A47J 36/26
(52) U.S. Cl. ........................ 219/433; 219/430; 219/432; 219/434
(58) Field of Search .................................. 219/430, 432, 219/433, 434, 436; 126/373.1

(56) References Cited

U.S. PATENT DOCUMENTS

| | | | | |
|---|---|---|---|---|
| 2,678,992 A | * | 5/1954 | Koch | 219/434 |
| 5,453,596 A | * | 9/1995 | Verveniotis | 219/433 |

* cited by examiner

Primary Examiner—Joseph Pelham
(74) Attorney, Agent, or Firm—Paul M Denk

(57) ABSTRACT

Disclosed herein is a hanging assembly for supporting an electric heater below a chafing dish or chafing pan. The removable electric chafing dish heater is supported by two identical hanging assemblies each with an elastic component to provide a constant thermal interface to the underside of a typical chafing dish. The hanging assembly provides a bent and curved device for holding the hanging assembly fast to a typical chafing frames that typically accompanies all chafing dishes. The chafing dish heater includes an electric flat plate element in a rectangular housing that is connected to a power assembly. The power assembly has an on/off switch, a power cord, and a visual indicator for representing the power is on/off.

4 Claims, 2 Drawing Sheets

ELECTRIC HEATER HANGING ASSEMBLY FOR CHAFING DISHES

CROSS-REFERENCE TO RELATED APPLICATIONS

This application claims priority to Provisional Application Ser. No. 60/207,262, entitled "Electric Heater For Chafing Dishes", filed May 26, 2000, and which is incorporated herein by reference.

STATEMENT REGARDING FEDERALLY SPONSORED RESEARCH OR DEVELOPMENT

Not Applicable.

FIELD OF THE INVENTION

The present invention relates generally to chafing dishes and the means of heating such chafing dishes. Specifically, the present invention relates to a removable electric heater that is suspended by hanging assemblies on a typical frame of a chafing dish, and provides thereby a contiguous heat transfer surface to the bottom of a resting chafing dish, for food or beverage warming.

BACKGROUND OF INVENTION

A chafing dish, chafing pan, or chafing dish is a portable container for warming, presenting, and serving a food or beverage. Chafing dishes are widely used in food service establishments, restaurants, hotels, dining halls, and in buffet service outlets. Chafing dishes offer the benefit of keeping a food or beverage warm for prompt and appetizing consumption, allow for attractive and immediate access to prepared food or beverages, and allows for presentation or serving of the food or beverage in remote or isolated areas not typically set-up for food service.

Typically, a small metal can with a flammable chemical fuel heats chafing dishes. A popular brand is the "Sterno" brand. One (or two) metal cans are set in an aperture(s) in the shelf provided and disposed below the chafing dish. Such means of heating chafing dishes are typical and of long-standing manufacture by a number of different manufacturers.

However, this method of heating with metal cans of flammable fuel has several problems for the food preparer and the consumer. The problems with this approach include: frequent odor from the burning fuel is unappetizing; the fuel cans make it difficult to control the temperature of the chafing dish; smoke and heat is generated; it is difficult to know when the metal can is about to deplete fuel and food becomes cold; the positioning of the heat source in two fixed locations in the shelf apertures provided causes the concentration of the heat in two places under the chafing dish, producing a discoloration and distortion of the chafing dish; the heat transfer from the fuel in the metal can to the chafing dish is uneven on the bottom of the chafing dish; the metal cans with flammable fuel are expensive to operate versus an electric source; and, the fuel in the cans presents a fire hazard in many environments.

There have been attempts to address the drawbacks to the above-described method of heating a chafing dish. For example, some chafing dish manufacturers have designed into their chafing dish an electric heating source that is integral and fixed to the bottom of a chafing dish. This approach has the disadvantage of being costly to manufacture, is not removable and thus is not universally applicable. It can also present a problem when cleaning or submerging the chafing dish in water for cleaning.

Another attempt to address the problem is with a removable electric heater with power cord that must be held fast to the bottom of a chafing dish by the addition of opposing welded shelf brackets to the underside of a chafing dish that will accept a particular type of electric chafing dish heater. A popular model of this type is the "Stego" heater. The problem with this approach is the chafing dish manufacturer must modify his chafing dishes with two opposing welded brackets especially designed just to hold the "Stego" heater. This increases costs and inventory, and chafing dishes made with the two opposing welded brackets cannot use the heater, so food service operators must maintain separate inventory of chafing dishes to accommodate this type of electric heater.

Another attempt to overcome the drawbacks of metal fuel cans is an electric heater that fits into the aperture of the shelf provided for acceptance of metal fuel cans disposed below the chafing dish. An example of this type of the model made by the Vollrath Company of Wisconsin. This electric heater for chafing dishes has the disadvantage of requiring two electric heaters to provide the heat transfer necessary for attaining the food warming temperature desired, and such electric heaters are positioned at two fixed location under the chafing dish thereby promoting excessive heat at these locations and promoting distortion of the chafing dish, and this approach does not apply the heat required evenly across the bottom of the chafing dish, and since this approach requires two heat sources, it can be more expensive to purchase and operate.

Other similar attempts have been made to address the drawbacks of metal fuel cans by various manufacturers in the U.S. and Japan, but all such known methods use designs that rely on the shelf support disposed below the chafing dish.

SUMMARY OF THE INVENTION

One embodiment of the invention is an electric heater for a chafing dish that includes a chafing dish, a chafing pan, or a chafing dish, with a circumscribed top flat band on edge for suspending the chafing dish with a shelf disposed below, whereby the electric heater is suspended by two hanging assemblies, each with an elastic component for assuring the electric heater is contiguous against the bottom of the heater.

Another embodiment of the invention is the two hanging assemblies are held fast to the circumscribed top flat band on edge by a bent and curving device that includes an elastic component. The hanging assemblies are sized so as to maintain the electric heater for a chafing dish next to and contiguous with the underside of the chafing dish.

Another embodiment of the invention is the electric heater is manufactured with an element in a conductive metal housing made of a refractory pad with serpentine looped nichrome wire to provide a very uniform and coherent heat distribution across the electric heater and for effective and even heat transfer to the underside of the chafing dish.

DESCRIPTION OF THE PREFERRED EMBODIMENT

Figure 1:
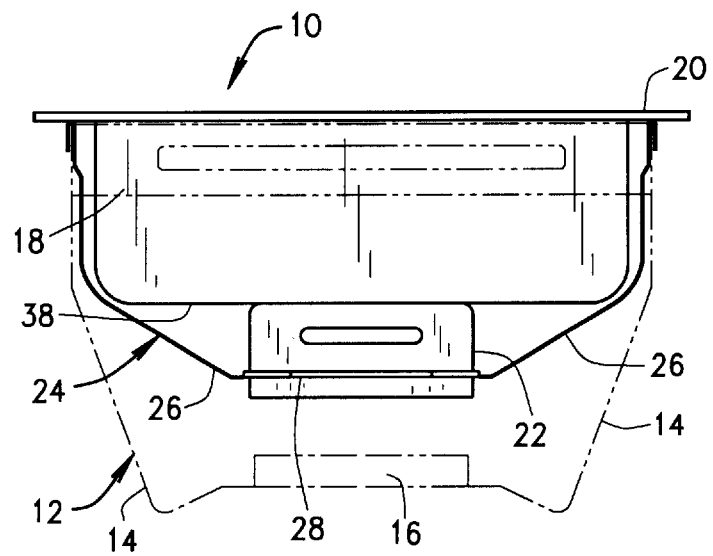
FIG. 1 is an end view of the electric heater for chafing dishes supported below a chafing dish by a hanger assembly of the invention.
Figure 2:
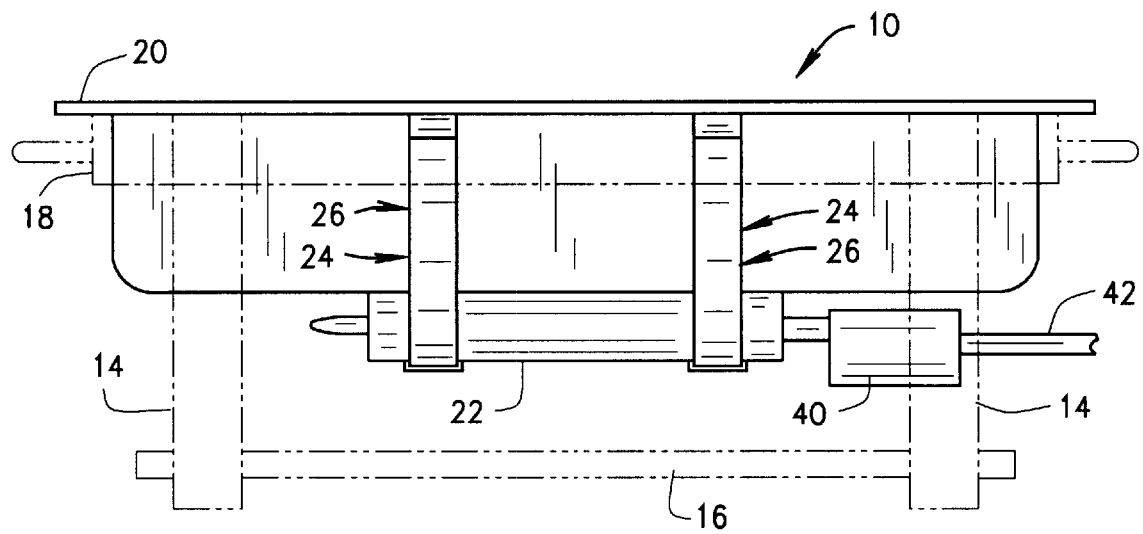
FIG. 2 is a side view of the electric heaters for chafing dishes supported below the chafing dish by the hanger assembly.

In referring to the drawings, FIGS. 1 and 2 show a chafing dish 10, which sits on a support 12. The support 12 includes a pair of legs 14 separated by a shelf 16 at the bottom of the legs. A band 18 extends around the outside of the legs 14 and defines an opening through which the chafing dish can slidably fit. The chafing dish 10 includes a flange 20 which sits on the upper edge of the band 18 to be supported above the shelf 16.

A heater unit 22 is suspended below the chafing dish by a hanger assembly 24. The heater is preferably an electric heater having a power supply and a power cord. The heater preferably includes a refractory element with a close proximity filament wire in a serpentine design, imbedded in a refractory pad, set inside and directly against a thermal conducting metal housing with insulation behind, connected to input power at a power assembly box. The filament wire is preferable a nichrome filament wire stretched in a serpentine design to yield a power wattage so as to provide thermal transfer to a chafing dish at a predetermined and required temperature without further inputs or controls. The use of such a heating element provides for an even and coherent distribution of heat over the thermal conducting metal housing and thereby against the underside of a chafing dish. This substantially prevents and inhibits discoloration and distortion of the chafing dish.

Figure 3:
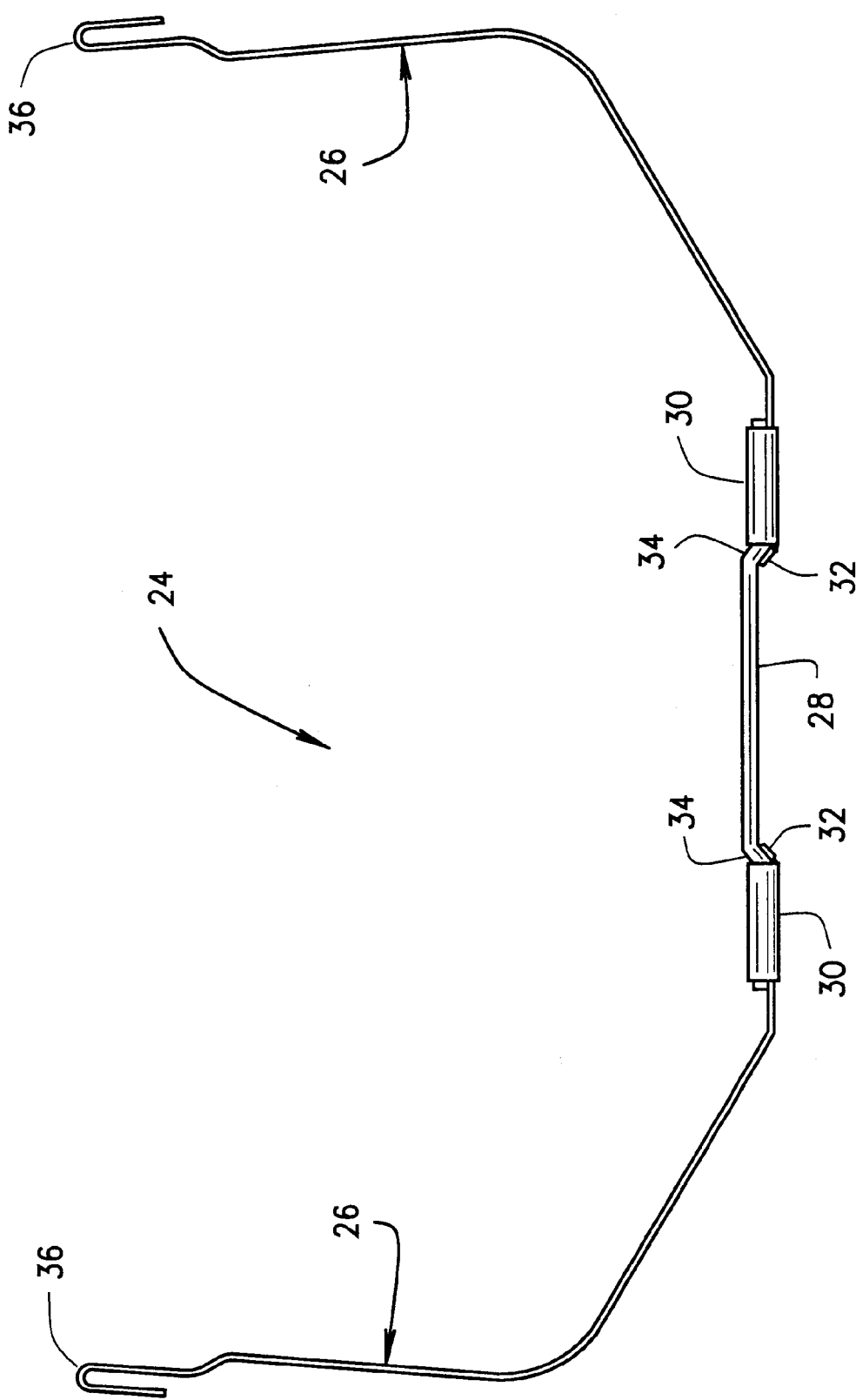
FIG. 3 is an end elevational view of the hanger assembly.

The hanger assembly 24, shown in FIG. 3, includes a pair of curved metal bands 26 spaced apart at their bottoms by an elastic or resilient support 28 that spans the distance between the ends of the two bands. The spanning elastic support 28 can be formed of silicone rubber, or any related material. The metal bands 26 are crimped to the support 28 and held in position by means of clamps 30, as can be seen, secured to the lower ends of the bands 26. In the crimping, the ends of the metal band are crimped upwardly, as at 32, to induce an upward or sloped surface 34 of the elastic support 28, for support purposes, and to facilitate a direct contact of the heater element 22 with the underside of the chafing dish 10.

The upper ends of the bands 26 are bent, as at 36 to define an inverted U-shaped upper end to the arms. This bent portion 36 of the bands 26 is sized to slidably fit over the band 18 of the chafing dish support 12.

The chafing dish 10 includes a generally flattened bottom 38, as can be noted. At least one, perhaps two, electrical heaters 22 are arranged in proximity with the chafing dish bottom 38, supported fully by the hanger assembly 24. The electrical heaters 22 are connected by a power supply or assembly 40, to provide for the conduct of electrical charge to the heater. A power cord 42 extends from the power supply 40 for connection into an electrical outlet.

In this embodiment, the electrical heater 22 is suspended by means of one or more hanging assemblies 24, two of which are shown in the shape and form of curved metal bands 26 that suspend the heater 22 beneath the chafing dish 10 to be in heating contact with the chafing dish 10. The two hanging assemblies are identical, and, as noted above, each includes an elastic support or tray 28, generally at the vicinity underneath of the supported heater. The distance between the elastic support 28 and the bottom 38 of the chafing dish 10 is approximately equal to the height of the heater 22. Thus, the resilient or elastic nature of the support 28 will positively hold the heater positively against the underside of the chafing dish 10, providing for a constant thermal interface with the underside of the chafing dish, when in use. This provides for an even and coherent distribution of the heat over the thermal conducting metal housing, and thereby against the underside of the chafing dish, during its usage and application.

Using the heaters 22 suspended in the manner as described and shown herein, prevents the underside of the chafing dish from attaining discoloration, even during constant usage. The curved bands 26 extend upwardly along the sides of the chafing dish, to support it from the upper edge of the support band 18. The hanger assembly bands 26 are formed of metal, and the elastic component 28 is generally fabricated from silicone, and integrated into the structure of the curved metal bands, as described above.

Thus, as shown and described herein, this invention depicts a chafing dish/pan, or chafing dish 10, that may contain a food or beverage to be warmed, and a frame support 12 with a shelf 16 disposed therebelow. There is a removable electric heater 22 for the chafing dish, supported by two hanging assemblies 24 which are suspended from the top of the band 18 on the edge of the supporting frame. Thus, contiguous heat is continuously transferred to the underside of the chafing dish, when set within its frame, to provide for the heating and warming of the chafing dish's contained food product.

Variations or modifications to the subject matter of this invention may occur to those skilled in the art upon review of the invention as described herein. Such variations, if within the spirit of this development, are intended to be encompassed within the invention as shown and described. The description of the preferred embodiment, as also disclosed in the drawings, is set forth for illustrative purposes only.

Having thus described the invention, what is claimed and desired to be secured by Letters Patent is:

1. A hanger assembly for supporting an electric heater below a chafing dish and in thermal contact with a chafing dish; the chafing dish being supported on an upper edge of a support frame;

the hanger assembly including a pair of spaced apart hangers; each hanger including a pair of hanger bands, each having an upper and a lower end, the upper end of the hanger bands being bent over, and said band upper ends being slidedly received on the support frame; the lower ends of the hanger bands being disposed approximately under and supporting an electric heater; the lower ends of the hanger bands being connected to a spanning elastic support, with the elastic support being arranged in contact under an electric heater of the assembly; the hanger bands being of a size such that the elastic members of the hanger assembly hold the heater in positive contact with an underside of the chafing dish.

2. The hanger assembly of claim 1 wherein the hanger bands extend under the spanning elastic support; each hanger band at its lower end being bent upwardly in its connection with spanning elastic support to form a sloped surface for contacting the said spanning elastic support to force it upward and the heater into positive contact with an underside of a chafing dish.

3. The hanger assembly of claim 2 wherein the lower ends of the hangers are crimped to their spanning elastic supports.

4. A hanger assembly for supporting an electric heater below a chafing dish and in thermal contact with a chafing dish; the chafing dish being supported on an upper edge of a support frame;

the hanger assembly including a least one hanger, each hanger including a pair of hanger bands, each having an upper and a lower end, the upper end of the hanger bands being bent over, and said band upper ends being slidedly received on the support frame, the lower ends of the hanger bands being disposed approximately under and supporting an electric heater; the lower ends of the hanger bands being connected to a spanning elastic support, with the elastic support being arranged in contact under an electric heater of the assembly; the hanger bands being of a size such that the elastic support of the hanger assembly holds the heater in positive contact with an underside of the chafing dish.

* * * * *